(12) United States Patent
Park et al.

(10) Patent No.: US 9,554,507 B2
(45) Date of Patent: Jan. 31, 2017

(54) MOWING ROBOT WITH MOWING BOUNDARY AREA AND GRASS LENGTH RECOGNIZER

(71) Applicant: Electronics and Telecommunications Research Institute, Daejeon (KR)

(72) Inventors: Jae Hyun Park, Daejeon (KR); Sung Lok Choi, Seoul (KR); Won Pil Yu, Ulsan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 109 days.

(21) Appl. No.: 14/220,579

(22) Filed: Mar. 20, 2014

(65) Prior Publication Data
US 2015/0096276 A1   Apr. 9, 2015

(30) Foreign Application Priority Data
Oct. 7, 2013 (KR) .................. 10-2013-0119212

(51) Int. Cl.
*A01D 34/00* (2006.01)
(52) U.S. Cl.
CPC ..... *A01D 34/008* (2013.01); *G05D 2201/0208* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,603,753 A | * | 8/1986 | Yoshimura | G05D 1/0259 180/168 |
| 2005/0007057 A1 | | 1/2005 | Peless et al. | |
| 2005/0034437 A1 | * | 2/2005 | McMurtry | A01D 34/008 56/1 |
| 2005/0257508 A1 | * | 11/2005 | Modzik | A01D 34/44 56/7 |
| 2008/0109126 A1 | * | 5/2008 | Sandin | G05D 1/028 701/23 |
| 2008/0282658 A1 | * | 11/2008 | Bernini | A01D 34/008 56/10.2 E |

* cited by examiner

*Primary Examiner* — Alicia Torres
(74) *Attorney, Agent, or Firm* — Kile Park Reed & Houtteman PLLC (57) ABSTRACT

A mowing boundary area recognizing apparatus of a mowing robot includes a ground state measurer configured to acquire environment data of a ground based on a grass length on the ground, a determiner configured to determine the grass length on the ground on a basis of the ground environment data to recognize a mowing boundary area, and a controller configured to adjust running of the mowing robot to a mowing area for which mowing is needed.

4 Claims, 5 Drawing Sheets

MOWING ROBOT WITH MOWING BOUNDARY AREA AND GRASS LENGTH RECOGNIZER

CROSS-REFERENCE TO RELATED APPLICATIONS

This application claims priority under 35 U.S.C. §119 to Korean Patent Application No. 10-2013-0119212, filed on Oct. 7, 2013, the disclosure of which is incorporated herein by reference in its entirety.

TECHNICAL FIELD

The present invention relates to a mowing boundary area and grass length recognizing apparatus and method of a mowing robot, and more particularly, to a mowing boundary area and grass length recognizing technology for automatic mowing of a mowing robot.

BACKGROUND

Mowing work is simple in characteristic, and is mainly performed in the middle of summer. Therefore, when a worker directly performs mowing work by using a mowing apparatus for a long time, physical fatigue is caused to the work. In addition, since the mowing apparatus includes a plurality of mowing blades, the risk of safety accident is high.

Technology for a mowing apparatus, which solves the problem and automates mowing work, is disclosed in U.S. patent application Ser. No. 10/913,596, but mowing apparatuses of the related art are mainly designed for a narrow area, such as a garden of a general house or the like, and a standardized area such as a soccer filed or the like.

In particular, the related art mowing apparatus operates in a method where a signal line is separately set in a boundary area so as to differentiate mowing areas. An electromagnetic signal, a radio signal, or an optical signal is used as the signal line of the boundary area, and when the signal is emitted, a mowing robot recognizes a mowing boundary line by using a signal detector included in the mowing robot, and performs mowing work in a mowing area.

As described above, since a related art method of recognizing a mowing boundary area by using a signal line needs an additional apparatus for recognizing a boundary line, the related art method cannot recognize a work area when an error occurs in a signal line recognizing apparatus or a signal line, and moreover, in terms of cost and practicality, it is not appropriate to apply the related art method to a broad and irregular work area.

To overcome limitations of the mowing boundary area recognizing apparatus based on the signal line, a method was proposed in which metal or a magnet is provided near a boundary, and a mowing robot detects the metal or the magnet to recognize the boundary.

However, in the method, a separate apparatus provided near a boundary area is needed similarly to the method using the signal line, a sensor for sensing the separate apparatus is separately added, and mowing work is much affected by an external environment.

Moreover, technology of the related art for determining grass lengths determines whether to perform mowing work by using height information acquired by a lawn length sensor, and does not include a more accurate mowing control function that is performed depending on lawn lengths.

SUMMARY

Accordingly, the present invention provides an apparatus and a method, which recognize a mowing boundary area on the basis of a ground environment in a boundary area without an external apparatus being separately provided, and determines grass lengths to control a mowing robot.

In one general aspect, a mowing boundary area recognizing apparatus of a mowing robot includes: a ground state measurer configured to acquire environment data of a ground based on a grass length on the ground; a determiner configured to determine the grass length on the ground on a basis of the ground environment data to recognize a mowing boundary area; and a controller configured to control running of the mowing robot to a mowing area for which mowing is needed.

In another general aspect, a mowing boundary area recognizing method of a mowing robot includes: acquiring environment data of a ground based on a grass length on the ground; determining the grass length on the ground on a basis of the ground environment data to recognize a mowing boundary area; and adjusting running of the mowing robot to a mowing area for which mowing is needed.

In another general aspect, a grass length recognizing method of a mowing robot includes: detecting a distance between the mowing robot and a plant growing on a ground; when the detected distance is equal to or less than a certain value, determining the plant-growing ground as a mowing-required area; and running the mowing robot to the mowing-required area.

In another general aspect, a grass length recognizing method of a mowing robot includes: detecting, by a sensor, a plant growing on a ground as an obstacle; determining the obstacle-detected ground as a mowing area for which mowing work is needed; and running the mowing robot to the mowing area.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
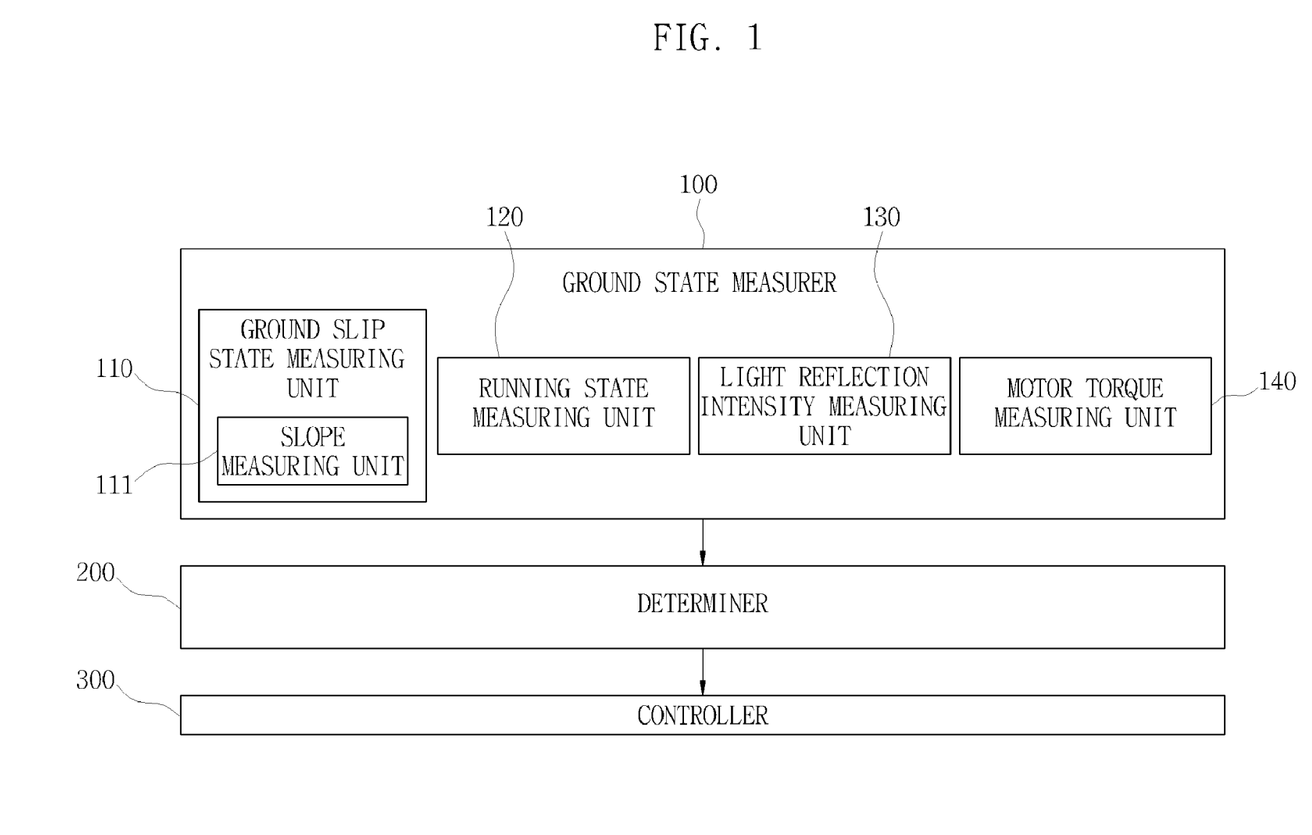
FIG. 1 is a block diagram illustrating a mowing boundary area recognizing apparatus according to an embodiment of the present invention.

FIG. 1 is a block diagram illustrating a mowing boundary area recognizing apparatus according to an embodiment of the present invention.

Referring to FIG. 1, the mowing boundary area recognizing apparatus according to an embodiment of the present invention includes a ground state measurer 100 that acquires environment data of the ground based on grass lengths on the ground, a determiner 200 that determines grass lengths on the ground on the basis of the acquired ground environment data to recognize a mowing boundary area, and a controller 300 that adjusts running of a mowing robot to a mowing-required area.

The ground state measurer 100 includes one or more of a ground slip state measuring unit 110 that acquires ground environment data used to determine grass lengths on the ground, a running state measuring unit 120, a light reflection intensity measuring unit 130, and a motor torque measuring unit 140.

The ground slip state measuring unit 110 according to an embodiment of the present invention estimates a friction coefficient of a wheel of a mowing robot on the basis of frictional force of the wheel of the mowing robot, or estimates a degree of slip of the ground on the basis of the frequency number of slip occurrence of the ground.

Generally, the mowing-required area is divided into a plants-growing area and a non-plant area. In the plants-growing area, since the frictional force of the wheel of the mowing robot is low, a low friction coefficient is measured, and a lot of slips occur.

However, an area requiring no mowing is covered by a road, the dirt, gravels, etc. without plants growing therein, and thus, in comparison with an area in which a lot of plants grow, a relatively high friction coefficient is measured, and the low frequency number of slip occurrence is measured, whereby a mowing boundary region is recognized by measuring a friction coefficient and the frequency number of slip occurrence.

Therefore, when the friction coefficient of the wheel of the mowing robot acquired from the ground slip state measuring unit 110 is equal to or less than a certain value, or the frequency number of slip occurrence of the ground is equal to or greater than another certain value, the determiner 200 recognizes the ground as the mowing-required area, and the controller 300 adjusts running to the mowing robot to the ground that requires mowing work.

For example, the controller 300 checks a state of the ground on which the mowing robot is located, on the basis of a degree of slip of the ground acquired from the ground slip state measuring unit 110, and when reaching the non-plant area, the controller 300 determines the mowing robot as deviating from a boundary area, and provides a control command for allowing the mowing robot to return to a previous area.

The ground slip state measuring unit 110 includes a slope measuring unit 111 that, in the ground having a slope, corrects the friction coefficient of the wheel of the mowing robot and the frequency number of slip occurrence of the ground, in consideration of the slope of the ground.

Generally, in a flatland, the mowing robot may be controlled by estimating a slip state of the ground without considering a slope of each of the ground and the mowing robot. However, in a place (for example, an orchard or the like) having a slope, the friction coefficient and/or the frequency number of slip occurrence are/is changed due to the slope, and thus, the friction coefficient of the wheel of the mowing robot and the frequency number of slip occurrence of the ground differ from those of the flatland.

To measure an accurate slip state on the ground having a slope, in the present invention, the slope measuring unit 111 configured with a slope sensor and the like corrects the frictional force and a slip state on the ground having the slope, thereby providing accurate ground environment data despite the ground having the slope. The determiner 200 divides a mowing boundary area on the basis of data acquired from the slope measuring unit 111 of the ground state measurer 100

The running state measuring unit 120 measures a running state of the mowing robot, for determining grass lengths on the ground.

A difference occurs in a degree of slip of the ground depending on lengths of plants that grow on the ground for which grass lengths are to be determined, and affects a running state (for example, a running speed of the mowing robot based on the same power) of the mowing robot that runs on the ground.

Generally, in the ground where lengths of plants are long, the running speed of the mowing robot based on the same power has a relatively lower value than that of an area in which lengths of plants are short.

According to the embodiment, the present invention determines an after-mowing area, a before-mowing area, and grass lengths by using the ground environment data based on the running state of the mowing robot without a separate length measuring sensor that measures lengths of plants growing on the ground, thereby effectively providing a running command and a mowing command to the mowing robot.

The light reflection intensity measuring unit 130 measures a light reflection intensity of the ground based on a color, a content of water, and a roughness of the ground.

A reflection intensity of light is changed depending on a characteristic of the ground, and is affected by a roughness, a color, and a content of water of the ground. A dried state in which a content of water is relatively low shows higher reflection intensity than a state in which a content of water is relatively high, and the smoother the ground, the higher the intensity of reflected light. In addition, in a relationship between a color and reflection intensity, a reflection intensity of white is high, and a reflection intensity of brown is low.

As described above, in consideration of a reflection intensity of light based on a roughness, a color, and a content of water of the ground, the present invention uses a difference between reflection intensities of the grounds as data that is used for the mowing robot to recognize a mowing boundary because the mowing area shows green and the other area shows the other color (for example, brown, yellowish brown, black, or the like).

In detail, the mowing area in which there are plants has a relatively high content of water and an irregular surface. Also, most of plants show green, but a mowing-unrequired area, in which there are hardly plants growing on the ground, shows brown and black. Therefore, it is possible to determine a boundary area on the basis of a reflection intensity of light.

That is, the determiner 200 determines, as a mowing-required area, the ground in which reflection intensity data of the ground acquired from the light reflection intensity measuring unit 130 is equal to or greater than a certain value, and the controller 300 commands the mowing robot to move to the determined area.

The present invention previously remodels a reflection intensity of light, and differentiates the plants-growing area and the non-plant area by using the remodeled reflection intensity. Alternatively, a user directly sets or corrects the two areas in initially using the mowing robot, and the mowing robot recognizes the mowing boundary area.

The motor torque measuring unit 140 measures an amount of consumed current and a torque of a motor that drives a mowing blade of the mowing robot.

When the same power is applied to the motor driving the mowing blade, the torque in the ground having plants to be mowed is measured lower than that in the ground having no plant, and thus, the determiner 200 determines, as a mowing-required area, the ground in which an amount of consumed current or the torque of the motor is equal to or greater than a certain value.

Generally, since an amount of consumed current of the motor in the mowing area is greater than that of the motor in the mowing-unrequired area under a condition of the same time or the same power, the mowing boundary area may be determined by measuring the torque of the motor driving the mowing blade.

A torque intensity of the motor according to an embodiment of the present invention may be applied for adjusting a rotation intensity of the mowing blade or protecting the mowing blade against an obstacle (for example, a tree, a stone, or the like) that is not detected by an obstacle sensor, in addition to determination of the mowing area.

The mowing area is an area in which a lot of plants grow, and thus, when the same power is supplied, in comparison with the mowing-unrequired area, the number of rotations of the wheel is low, and an amount of consumed current based on the number of rotations of the wheel is high.

Furthermore, an amount of consumed current of the mowing robot in an area in which plants growing on the ground are long is relatively higher than that of the mowing robot in an area in which plants growing on the ground are short, and thus, the determiner 200 compares the measured number of rotations of the mowing robot and the measured amount of consumed current to determine the mowing boundary area and grass lengths on the ground.

Moreover, in order to estimate a ground state, the present invention may use a sensor (which measures a placement) such as a camera, an accelerometer sensor, or the like, or may use a method that compares the number of rotations of the wheel when the same power is supplied and a method that compares an amount of consumed current when the wheel is rotating.

According to an embodiment of the present invention, the determiner 200 detects a vertical distance between a plant growing on the ground and the mowing robot by using a distance sensor 410, and when the detected vertical distance is equal to or shorter than a certain distance, the determiner 200 determines an area, in which the plants grow, as an area that requires mowing work.

Figure 2A:
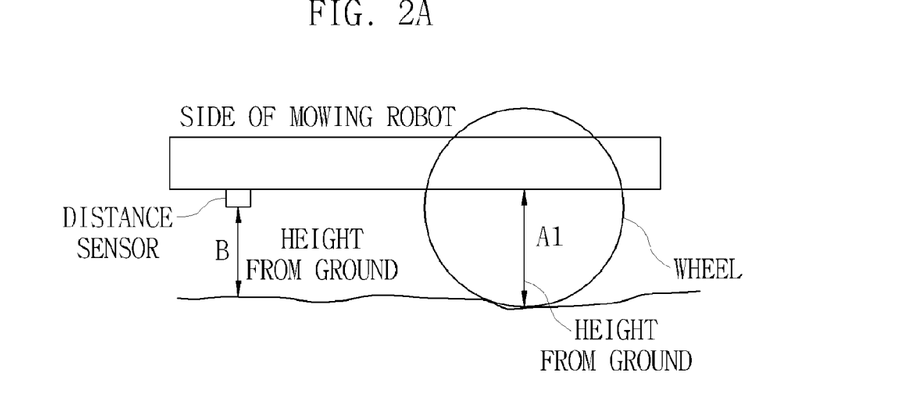
FIGS. 2A to 2C are diagrams illustrating examples of a grass length recognizing method according to an embodiment of the present invention, respectively.
Figure 2B:
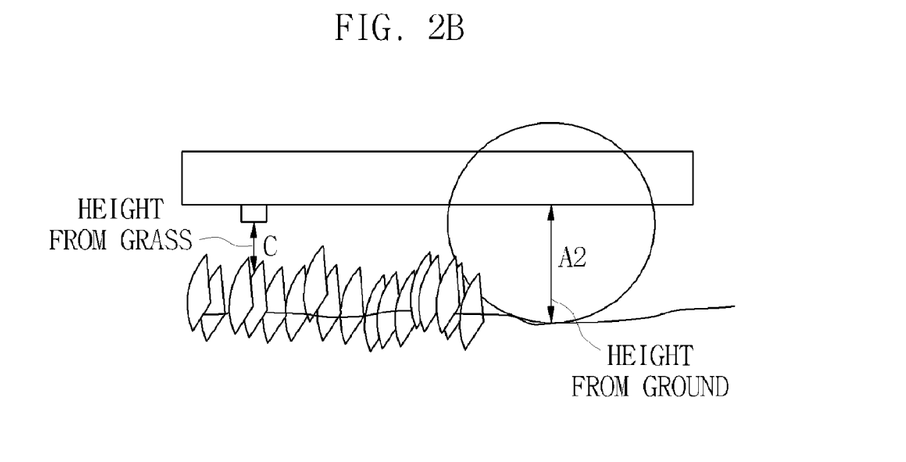
Figure 2C:
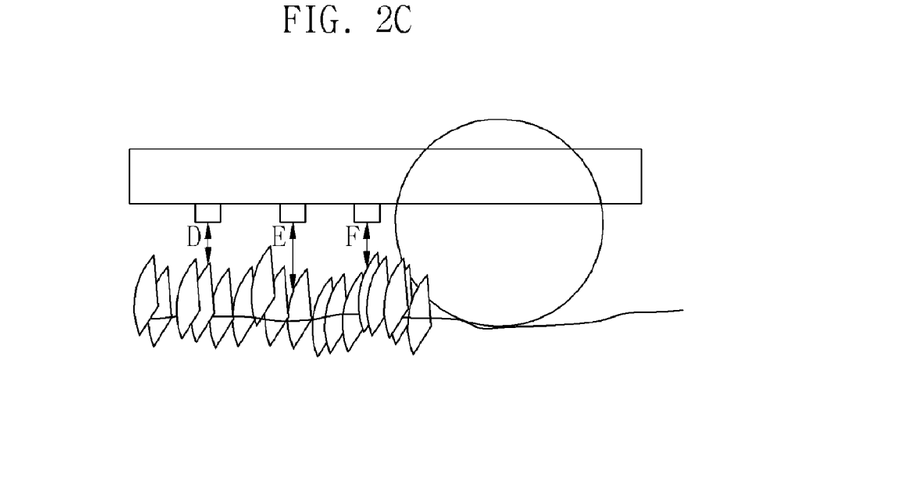

FIG. 2 is diagrams illustrating a method of determining a grass height by using the distance sensor 410 according to another embodiment of the present invention.

As illustrated in FIG. 2A, the distance sensor 410 measures a height b between the distance sensor 410 and the ground as being similar to a distance a between the ground and a bottom of the mowing robot (A1≈B), in an area where there is no plant.

However, when there are plants on the ground, as illustrated in FIG. 2B, a distance c between the plant and the distance sensor 410 is obtained as a value less than the distance a between the ground and the bottom of the mowing robot (A2>C).

Based on such a result, the mowing robot detects heights of plants growing on the ground by using the distance sensor 410 to determine grass lengths.

FIG. 2A illustrates an example in which a grass height is measured, and a sensor is arranged, in a non-plant or mowed area. FIG. 2B illustrates a method of measuring a grass height in a plants-growing area. FIG. 2C illustrates an example in which a plurality of sensors are arranged.

When two or more the distance sensors 210 are equipped in the mowing robot, as illustrated in FIG. 2C, an average value (for example, an average value of d, e, f) of distances between the distance sensors 210 and plants growing on the ground may be determined as a distance between a plant and a sensor. Therefore, when a plurality of the distance sensors 210 are provided, a distance value between a high-reliability plant and the distance sensor 210 may be determined. Also, when the plurality of distance sensors 210 are provided, mowing can be more accurately controlled than when a deviation of heights of plants growing on the ground is high.

Figure 3A:
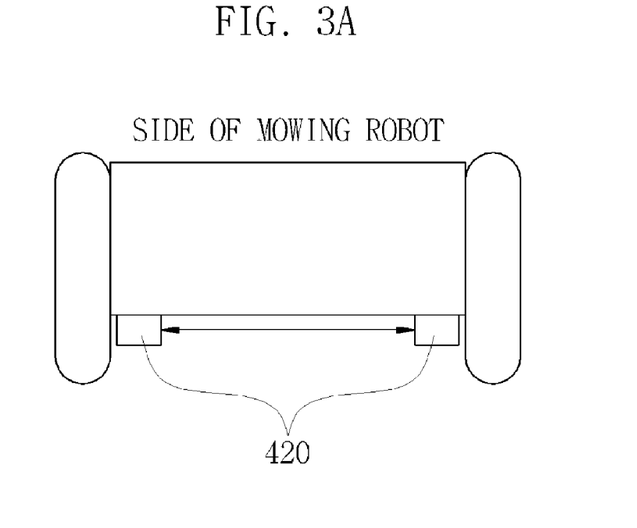
FIGS. 3A to 3C are diagrams illustrating arrangements of obstacle sensors according to an embodiment of the present invention, respectively.
Figure 3B:
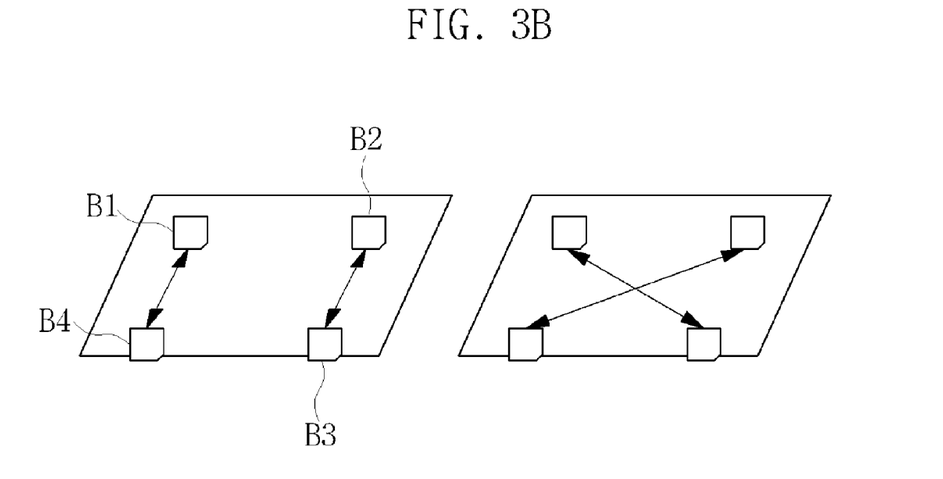
Figure 3C:
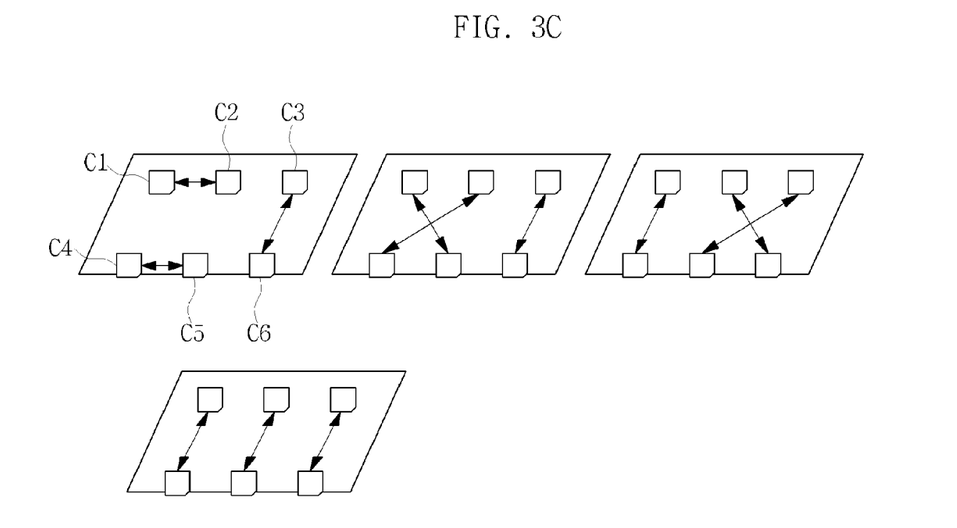

FIGS. 3A, 3B and 3C are is a diagram illustrating an arrangement of sensors for determining the presence of an obstacle according to an embodiment of the present invention.

The determiner 200, as illustrated in FIG. 3A, includes two or more obstacle sensors 420 that are arranged in correspondence with each other.

In an embodiment of FIG. 3A, grass lengths are determined by using the two obstacle sensors 420. The obstacle sensors 420 are disposed under a body of the mowing robot, and when the obstacle sensors 420 are disposed in order for a height to be adjusted, a grass height may be determined. Adjusting the height of the obstacle sensor 420 denotes that a position of the obstacle sensor 420 is manually or automatically adjusted in a vertical direction.

FIGS. 3B and 3C are diagrams illustrating a case in which two or more obstacle sensors 420 according to an embodiment of the present invention are provided, respectively. FIG. 3B is a diagram illustrating one of various arrangement types in which four obstacle sensors 420 are arranged.

As illustrated in FIG. 3C, when a plurality (for example, six) of the obstacle sensors 420 are provided, the plurality of obstacle sensors 420 may be arranged in more various types than a case in which the four obstacle sensors 420 are arranged.

As illustrated in FIGS. 3B and 3C, the controller 300 controls running of the mowing robot to an obstacle-detected place depending on the arrangement type of the obstacle sensors 420.

FIG. 3B is a diagram illustrating an example of arrangement in a case where the four obstacle sensors B1, B2, B3 and B4 are provided. In this case, states respectively detected by the four obstacle sensors 420 are shown in the following Table 1.

TABLE 1

| Front Region | Rear Region | Description |
|---|---|---|
| 0 | 0 | Non-grass area |
| 0 | 1 | There is grass in a rear region. |
| 1 | 0 | There is grass in a front region. |
| 1 | 1 | There is grass in a front region and a rear region. |

When the obstacle sensors 420 are respectively provided in a front region and a rear region under the body of the mowing robot, the four states listed in Table 1 occur depending on the presence of plants growing on the ground. Based on the four states, running of the mowing robot is controlled according to grass lengths.

For example, when values detected by the obstacle sensors 420 are 1 in the front region and 0 in the rear region, the mowing robot runs to the front region because an area to mow is the front region, and when values detected by the obstacle sensors 420 are 0 in the front region and 1 in the rear region, the mowing robot runs to the rear region because an area to mow is the rear region.

In an arrangement type of the sensors illustrated in FIG. 3B, two of the four sensors are disposed in a front region to recognize plants growing in the front region, and the other two sensors are disposed in a rear region to recognize plants growing in the rear region. Therefore, running of the mowing robot is controlled to the front region or the rear region.

For example, when values detected by the sensors are 1 in the front region and 0 in the rear region, the mowing robot runs to the front region because an area to mow is the front region, and when values detected by the sensors are 0 in the front region and 1 in the rear region, the mowing robot runs to the rear region because an area to mow is the rear region.

When the number of sensors equipped in the mowing robot increases, the number of arrangement types of the sensors increases in proportion to the increased number of sensors, and thus, a mowing area is more subdivided. Therefore, running of the mowing robot is more precisely controlled, and grass lengths are more precisely checked.

FIG. 3C illustrates an example in which running of the mowing robot is variously controlled according to the arrangement type of a plurality of sensors C1, C2, C3, C4, C5 and C6 according to an embodiment of the present invention.

When the number of sensors equipped in the mowing robot increases, the number of arrangement types of the sensors increases in proportion to the increased number of sensors, and thus, a mowing area is more subdivided. Therefore, running of the mowing robot is more precisely controlled, and grass lengths are more precisely checked.

Furthermore, running of the mowing robot may be controlled by using a sensor such as a touch sensor, in addition to the distance sensor and the obstacle sensor.

Figure 4:
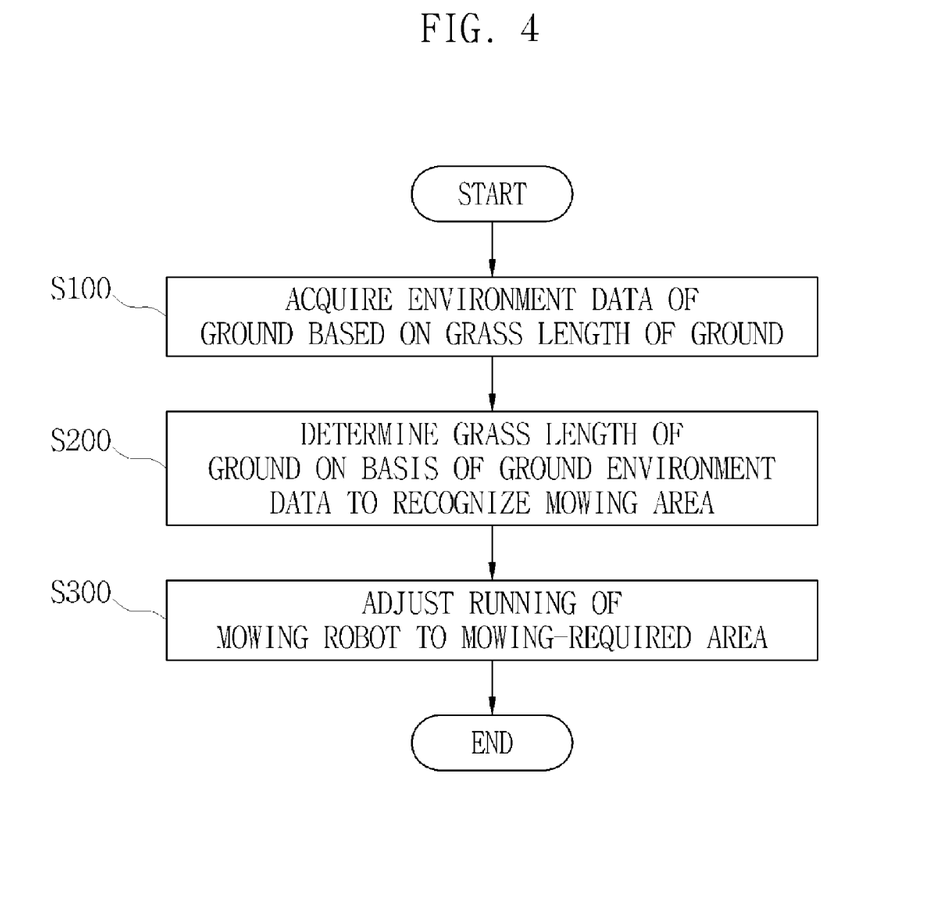
FIG. 4 is a block diagram illustrating a mowing boundary area recognizing method according to an embodiment of the present invention.

FIG. 4 is a block diagram illustrating a mowing boundary area recognizing method according to an embodiment of the present invention.

Referring to FIG. 4, the mowing boundary area recognizing method according to an embodiment of the present invention includes operation S100 that acquires environment data of the ground based on grass lengths on the ground, operation S200 that determines grass lengths on the ground on the basis of the acquired ground environment data to recognize a mowing boundary area, and operation S300 that adjusts running of a mowing robot to a mowing-required area.

Operation S100 of acquiring the environment data of the ground includes an operation that estimates a friction coefficient of a wheel of a mowing robot on the basis of frictional force of the wheel of the mowing robot, or estimates a degree of slip of the ground on the basis of the frequency number of slip occurrence of the ground. In operation S100, when the acquired friction coefficient of the wheel of the mowing robot is equal to or less than a certain value, or the frequency number of slip occurrence of the ground is equal to or greater than another certain value, the ground is determined as the mowing-required area.

In estimating a degree of slip of the ground, the mowing boundary area recognizing method performs an operation (not shown) that, in the ground having a slope, corrects the friction coefficient of the wheel of the mowing robot and the frequency number of slip occurrence of the ground, in consideration of the slope of the ground. Therefore, the ground (in which the friction coefficient corrected according to a slope of the ground is equal to or greater than the certain value, or the frequency number of slip occurrence of the ground is equal to or less than the other certain value) is determined as the mowing area, and running of the mowing robot is controlled.

In according to an embodiment of the present invention, operation S100 of acquiring the environment data of the ground measures an amount of consumed current and the number of rotations of the wheel of the mowing robot under a condition of the same power or the same time, and determines, as the mowing-required area, the ground in which the amount of consumed current and the number of rotations of the wheel of the mowing robot are equal to or greater than a certain value.

Moreover, operation S100 of acquiring the environment data of the ground measures a light reflection intensity of the ground based on a color, a content of water, and a roughness of the ground, and determines, as the mowing-required area, the ground in which the measured light reflection intensity of the ground is equal to or greater than a certain value, based on the measurement data.

Furthermore, operation S100 of acquiring the environment data of the ground measures an amount of consumed current and a torque of a motor that drives a mowing blade of the mowing robot, and compares the measured torque of the mowing robot and the measured amount of consumed current under a condition of the same power or the same time to provide data used to determine the mowing area. Subsequently, operation S100 determines, as the mowing-required area, the ground in which the measured torque of the mowing robot or the measured amount of consumed current is equal to or greater than a certain value, based on the data.

In an embodiment of the present invention, the sensor equipped in the mowing robot detects a mowing boundary area and grass lengths on the ground. In detail, the mowing boundary area recognizing method detects a distance between the mowing robot and plants growing on the ground, and when the detected distance is equal to or less than a certain value, the mowing boundary area recognizing method determines, as the mowing-required area, the ground on which the plants grow, and runs the mowing robot to the determined area.

The present invention relates to a grass length recognizing method of a mowing robot by using an obstacle sensor, which detects a plant growing on the ground as an obstacle, determines the obstacle-detected ground as the mowing-required area, and runs the mowing robot to the determined area. In the present invention, the distance sensor, the obstacle sensor, and the touch sensor are used for determining grass lengths on the ground.

Furthermore, running of the mowing robot may be controlled by using a sensor such as the touch sensor, in addition to the distance sensor and the obstacle sensor.

As described above, the present invention detects a mowing boundary area and grass lengths on the ground by using ground environment data, thereby enabling running of the mowing robot to be controlled. Furthermore, by using the sensor that detects lengths and presence of plants growing on the ground, the present invention provides a method that determines grass lengths on the ground, and provides an accurate mowing control function that more precisely controls running of the mowing robot depending on the number of sensors equipped in the mowing robot and the arrangement type of the sensors.

The above-described embodiments may be separately used in consideration of various factors such as a use environment, a performance of the mowing robot, etc., or the present invention may be used as various combinations of embodiments optimized for an environment and the performance of the moving robot.

As described above, in recognizing a mowing boundary area by using the mowing robot, the present invention recognizes a boundary of a mowing area by using environment data (including a slip state of the ground and an intensity of light reflected from the ground) of the ground and a measurement torque of the rotary blade of the mowing robot, without an additional apparatus.

Moreover, the present invention recognizes heights of growing plants and grass lengths by using the combination of sensors, and thus more accurately adjusts running of the mowing robot to provide an accurate mowing control function.

In addition, the mowing control function according to the present invention is variously applied for controlling running of a lawn mowing robot for gardens and a mowing robot for orchards, thus increasing convenience of a user in using equipment and productivity.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mowing boundary area recognizing apparatus of a mowing robot, the mowing boundary area recognizing apparatus comprising:
   a ground state measurer configured to acquire environment data of a ground based on a grass length on the ground;
   a determiner configured to determine the grass length on the ground on a basis of the ground environment data to recognize a mowing boundary area; and
   a controller configured to control running of the mowing robot to a mowing area for which mowing is needed,
   wherein, the ground state measurer comprises a ground slip state measuring unit configured to estimate a friction coefficient of a wheel of the mowing robot on a basis of frictional force of the wheel of the mowing robot, and
   when the friction coefficient of the wheel of the mowing robot acquired from the ground slip state measuring unit is equal to or less than a certain value the determiner recognizes the ground as the mowing area.

2. The mowing boundary area recognizing apparatus of claim 1, wherein,
   the ground slip state measuring unit comprises a slope measuring unit configured to, in a ground having a slope, correct the friction coefficient of the wheel of the mowing robot in consideration of the slope of the ground, and
   the determiner determines the mowing area on a basis of the corrected friction coefficient of the ground according to the slope of the ground.

3. A mowing boundary area recognizing method of a mowing robot, the mowing boundary area recognizing method comprising:
   acquiring environment data of a ground based on a grass length on the ground;
   determining the grass length on the ground on a basis of the ground environment data to recognize a mowing boundary area; and
   adjusting running of the mowing robot to a mowing area for which mowing is needed,
   wherein the acquiring of environment data comprises:
   estimating a friction coefficient of a wheel of the mowing robot on a basis of frictional force of the wheel of the mowing robot; and
   recognizing the mowing area on a basis of the estimated friction coefficient of the wheel of the mowing robot.

4. The mowing boundary area recognizing method of claim 3, wherein the estimating of a friction coefficient comprises, in a ground having a slope, correcting the friction coefficient of the wheel of the mowing robot in consideration of the slope of the ground.

* * * * *